United States Patent [19]

Davis et al.

[11] Patent Number: 4,749,991
[45] Date of Patent: Jun. 7, 1988

[54] TURN OFF PROTECTION CIRCUIT

[75] Inventors: Walter L. Davis, Plantation, Fla.; Wendell L. Little, Austin, Tex.; Barry W. Herold, Lauderhill, Fla.

[73] Assignee: Motorola, Inc., Schaumburg, Ill.

[21] Appl. No.: 54,079

[22] Filed: May 21, 1987

Related U.S. Application Data

[63] Continuation of Ser. No. 885,810, Jul. 5, 1986, abandoned, which is a continuation of Ser. No. 528,709, Sep. 1, 1983, abandoned.

[51] Int. Cl.$^4$ ............................................... H04Q 1/00
[52] U.S. Cl. ................................. 340/825.31; 364/709
[58] Field of Search ................... 364/705, 706, 709; 363/59, 60, 15; 340/365, 825.31; 318/446

[56] References Cited

U.S. PATENT DOCUMENTS

| | | |
|---|---|---|
| 3,541,453 | 11/1970 | Vanderpoel et al. . |
| 3,611,156 | 10/1971 | Ward . |
| 3,769,593 | 10/1973 | Williams . |
| 3,963,906 | 6/1976 | Yamamura et al. ................. 364/709 |
| 4,066,462 | 2/1977 | Podowski et al. . |
| 4,279,021 | 7/1981 | See et al. .......................... 364/709 X |
| 4,380,832 | 4/1983 | Nagata et al. . |
| 4,412,218 | 10/1983 | Niitsu ........................... 340/365 S X |
| 4,451,743 | 5/1984 | Suzuki et al. ...................... 363/60 X |
| 4,488,250 | 12/1984 | Lipsey et al. ........................ 364/709 |
| 4,491,905 | 1/1985 | Arakawa ............................... 318/446 |

Primary Examiner—Ulysses Weldon
Attorney, Agent, or Firm—Winfield J. Brown, Jr.; Joseph T. Downey; Anthony J. Sarli, Jr.

[57] ABSTRACT

In system capable of self turn-off, a circuit arrangement for providing a controlled turn-off includes a detecting circuit for detecting actuation of a turn-off switch, thereby providing a turn-off authorization signal. A turn-off protection circuit is coupled to the detecting circuit and a controller is coupled to the turn-off protect circuit and the detecting circuit. The controller disables the turn-off protect circuit when the turn-off authorization is received and present. The controller generates a turn-off signal for powering the system down after the turn-off protect circuit has been disabled.

13 Claims, 9 Drawing Sheets

TURN OFF PROTECTION CIRCUIT

This application is a continuation of 885,810 having a filing date of 7/5/86, now abandoned, which is a continuation of 528,709 having a filing date of 9/1/83, now abandoned.

BACKGROUND OF THE INVENTION

1. Field of the Invention

This invention relates generally to the field of systems capable of internally generating control signals and a method and apparatus for inhibiting the effect of generation of those signals unless appropriately authorized. More particularly, this invention relates to a microprocessor controlled radio pager wherein the microprocessor has the capability of turning itself and the pager off, and a circuit arrangement and method for protecting the radio pager against inadvertently being turned off as a result of loss of program control.

2. Background of the Invention

It is frequently desirable to utilize a microprocessor or microcomputer in a paging receiver to control various decoding, alerting and power control functions. Since a paging receiver should be small, compact, and light weight, and therefore easily and conveniently carried on the person, the microcomputer provides a compact and powerful way to implement and actuate complex functions while maintaining small size.

It is frequently desirable to utilize so called "popple" or "snap dome" type switches such as those manufactured by K. B. Denver, Inc. of 451 Oak Street, Frederick, Colo., due to their small size, light weight, low cost and high reliability. These switches are normally open momentary type switches which may be readily interfaced with a microcomputer in order to control the various functions of the paging receiver. One example of such functions is to utilize a single momentary switch for a "push-on/push-off" function.

In such a computer controlled paging receiver, particularly where snap dome or other momentary switches are utilized, it is advantageous to have the microcomputer perform various functions, including the function of turning the receiver on and off upon receipt of an appropriate control input from an ON/OFF switch. Curiously enough, this combination of elements carries with it a possibility that the microcomputer could turn itself off.

In a simple implementation of such a system, the microcomputer periodically inspects the status of an OFF switch to determine if it has been actuated. If it has been actuated, the microcomputer can then send a control signal to the power source of the pager, which might be a switchable D.C. to D.C. converter. The power source then disables power to all circuits in the paging receiver requiring full power. It is likely that such a system would also require standby power to power certain standby circuits in the pager which allow the pager to come back to life upon recognition of the actuation of an ON switch.

In the system as described, the microcomputer has the ability to turn off the system as the microcomputer sees fit. It is possible due to the presence of high energy radio frequency fields, alpha particles, static discharge, loss of computer synchronization, etc. that the computer may deviate from the programmed operation and could erroneously generate a turn off signal without having received instructions to do so as a result of an OFF switch actuation. For systems which require a high level of system integrity over long periods of time, whether it is a paging receiver or other microcomputer controlled system, this may be an unacceptable circumstance. In the case of a paging receiver, the pager could cut itself off, thereby losing messages stored in memory and/or missing future paging messages until the user discovers that the pager is off. This seriously detracts from the utility, convenience and reliability of communications for which the pager is intended. In other computer controlled systems, the results of a self-initiated unchecked control signal generation can even be far more disastrous.

SUMMARY OF THE INVENTION

It is an object of the present invention to provide a hardware turn-off protection circuit for safeguarding a computer controlled system against unauthorized turn-off initiated by the computer.

It is another object of the present invention to provide a method of preventing the generation of a control signal by a computer unless the generation of such control signal is manually or otherwise appropriately authorized.

It is a further object of the present invention to provide an optimal hardware/software control system for preventing the generation of unauthorized control signals.

It is yet another object of the present invention to provide a turn-off protect circuit for use in a microcomputer controlled paging receiver for preventing the microcomputer from turning off the paging receiver's power source without manual authorization.

These and other objects of the present invention will become apparent to those skilled in the art upon consideration of the following description of the invention.

According to one embodiment of the present invention, a method of inhibiting the function of an internally generatable control signal unless externally authorized includes the step of first providing a protect circuit for selectively inhibiting the function of an internally generatable control signal when the protect circuit is enabled and for permitting the control signal to function when the protect circuit is disabled. Second, the protect circuit is selectively enabled to inhibit the function of the control signal. Third, an external authorization signal is detected. Fourth, the protect circuit is disabled while the authorization signal is present. Fifth, the function of the control signal is allowed.

In an alternate embodiment of the present invention, a method of preventing generation of internally generated control signals, except when such signals are externally authorized, includes first, providing a protect circuit. Second, an external authorization signal is detected. Third, the protect circuit is disabled while the authorization signal is present to establish a control signal output from the protect circuit.

In another embodiment of the present invention, a circuit arrangement for protecting against unauthorized internal generation of control signals in a system capable of internally generating control signals includes a detecting circuit for detecting an external authorization signal. A controller selectively internally generates a first control signal. A protect circuit which is operatively coupled to the detecting and the controller circuit selectively generates a second control signal in response to coincident receipt of the authorization signal and the first control signal. Preferably, the controller also includes a circuit for generating a third control signal and a gating circuit for receiving the second and third control signals and for selectively providing a fourth control signal corresponding to the third control signal in response to coincident receipt of the second and third control signals.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

DESCRIPTION OF THE PREFERRED EMBODIMENT

Figure 1:
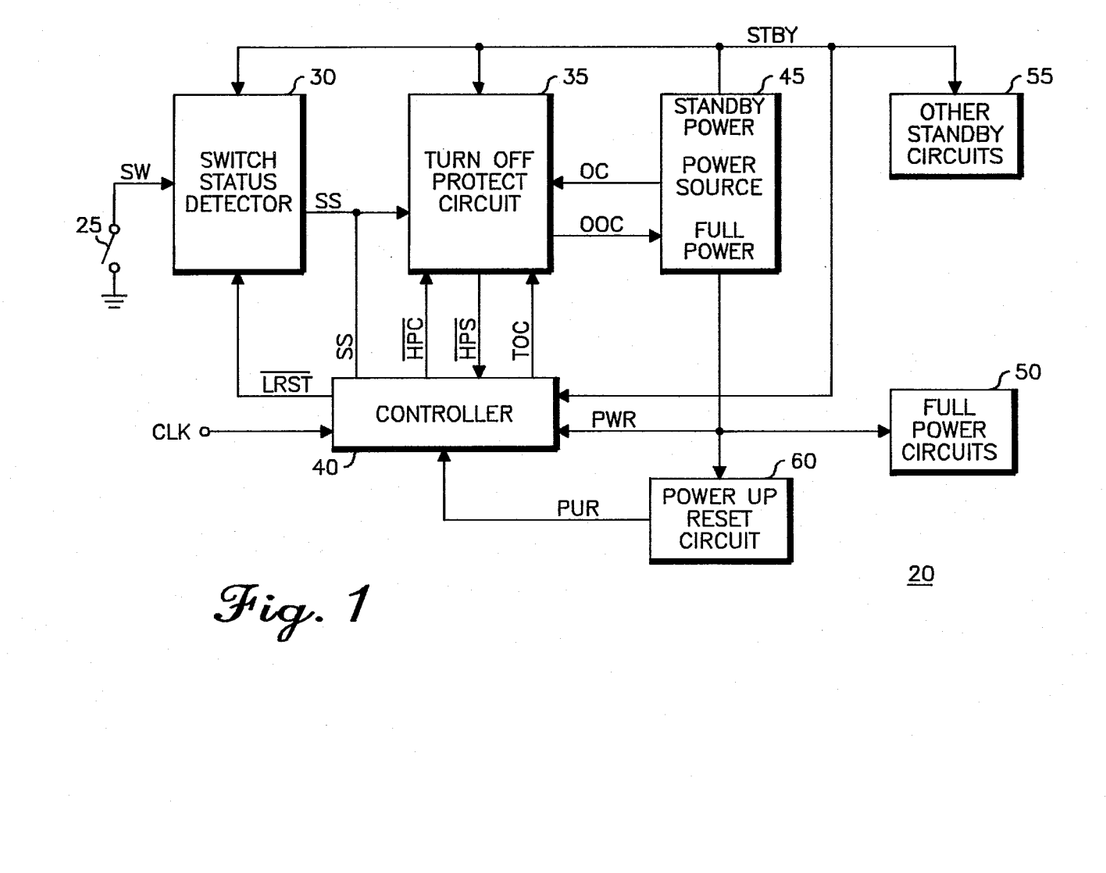
FIG. 1 shows a functional block diagram of a circuit arrangement for practicing the present invention.

The above objectives are satisfied in a system such as system 20 in FIG. 1. A switch 25 which is preferrably a normally open momentary contact switch provides a signal SW to a switch status detector 30. Switch status detector 30 provides switch status signal SS at its output which provides an indication of whether or not switch 25 has been actuated. Signal SS is coupled to a turn-off protect circuit 35 and to a controller 40. The turn-off protect circuit 35 is a hardware circuit which is external to controller 40 and provides turn-off protection in the event controller 40 attempts turn-off without having received authorization (by actuation of switch 25) to do so.

Controller 40, receives signal SS from switch status detector 30. When controller 40 determines the switch status detector 30 has detected an actuation of switch 25, it provides turn-off protect control signal $\overline{HPC}$ to disable the turn-off protect circuit. Signal $\overline{HPC}$ must occur while switch 25 is still in actuation in order for turn-off protect circuit 35 to be disabled. That is, $\overline{HPC}$ must occur while signal SS is still present. Turn-off protect circuit 35 then may provide controller 40 with a turn-off protect status signal $\overline{HPS}$ which indicates the status of the turn-off protect circuit.

If controller 40 verifies by monitoring signal $\overline{HPS}$ that turn-off protect circuit 35 has indeed been disabled, a turn-off control signal TOC is generated by controller 40 which may then be processed by turn-off protect circuit 35. If the turn-off protect circuit 35 has been appropriately disabled to allow turn-off to take place, so that signal $\overline{HPC}$ is still present, signal OOC is generated and passed to a power source 45.

When signal OOC is the appropriate off command signal level, the full power signal PWR is appropriately terminated. Thus, full power circuits 50 and 60, in addition to the controller 40, are powered down, thereby reducing current drain in the off or standby mode to a minimum.

When power source 45 is in the on condition, it generates a full power supply signal PWR which may supply power to any of the full power circuits 50, power up reset circuit 60, and in the preferred embodiment, power source 45 also supplies power to controller 40. In addition, power source 45 supplies standby power signal STBY to those circuits requiring stand-by power such as switch status detect 30, turn-off protect circuit 35 and any other stand-by circuits 55 which may remain operative when the system as a whole is in the off condition.

The term power source as used herein is intended to be a generic term describing any circuit or component which may be used to supply or feed power to any other circuit. Circuit elements which may fall into this general category are, for example, batteries, voltage regulators, DC to DC converters, combinations of the above etc., but are not to be limited to these. Similarly, the terms turn-off and standby are used interchangeably herein to represent a state of reduced power drain and system activity.

According to the preferred embodiment controller 40 comprises a clocked logic controller which may be a microprocessor based controller or a hardware state machine. As such, clock signal CLK, which may be generated by a circuit powered by either STBY or PWR, is periodically delivered to controller 40 to assure proper timing and synchronization. The frequency of signal CLK is dependent upon the type of controller used and the time duration switch 25 must be actuated to effect turn-off. It is typically the case that a power up reset circuit 60 is required for such a controller in order to establish the initial states of the controller by delivering a power-up reset signal PUR to the controller upon initial application of power.

According to a preferred mode of operation of the present invention, switch 25 functions as both an on switch and an off switch and may also serve the function of another pager control switch. According to this embodiment, if the paging receiver is off, actuating switch 25 will turn the pager on. If the pager receiver is on, a brief actuation of switch 25 may be used to operate another pager function while an extended actuation of switch 25, lasting perhaps one second or longer, causes the off sequence to occur.

In the pager function mode of operation, that is, when the switch is utilized to actuate neither off nor on commands, controller 40 generates a latch reset signal LRST periodically for resetting switch status detector 30. If switch 25 has been deactuated prior to the first LRST signal being applied to the switch status detector 30, a switch status signal SS changes level. This change informs the controller that the pager function is being actuated and the off sequence is inhibited. When the off sequence is subsequently desired, signal OOC preferably is generated upon deactuation of switch 25 occurring after the next $\overline{LRST}$ signal.

When the pager is in the off or stand-by mode and the user desires full on operation, actuation of switch 25 causes switch status detector 30 to indicate that the switch has been actuated by applying signal SS to the controller. The controller then applies signal TOC to the turn-off protect circuit 35 which generates signal OOC to enable power source 45. When power source 45 is turned on and on complete signal OC is generated in the power source, signal OC is transferred to the turn-off protect circuit 35.

Figure 2:
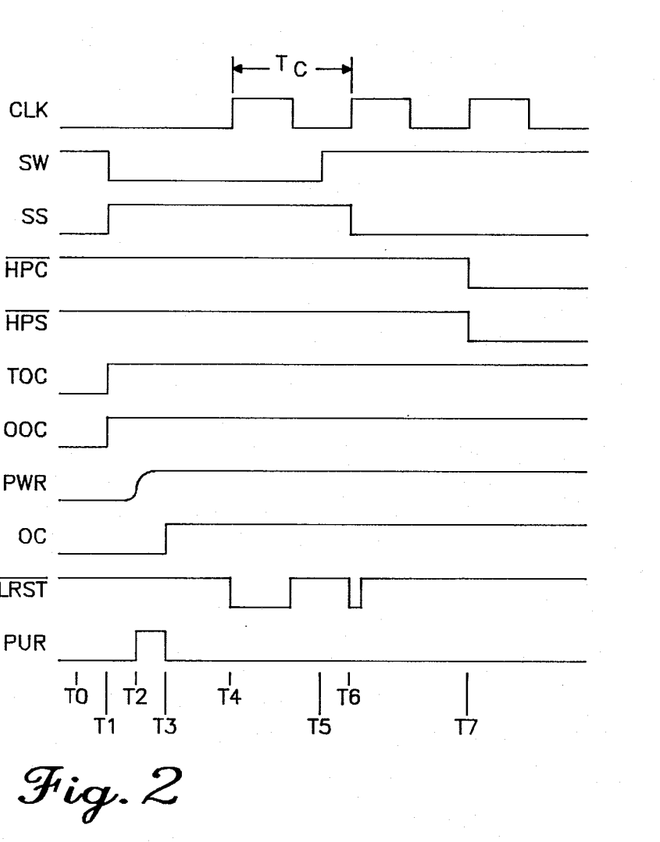
FIG. 2 shows a timing diagram for the turn-on cycle of the system of FIG. 1.

A more detailed understanding of the system's operation may be obtained by turning now to the timing diagram for the power up sequence of system 20 shown in FIG. 2. At time T0, system 20 is in the off or standby mode and the full power output PWR of power source 45 is inactive. Therefore, only standby circuits are active at this time. At time T1, the user actuates switch status 25 causing a high to low transition of the SW signal. This input is processed by switch status detector 30 causing its output signal SS to make a low to high transition. For purpose of the present discussion, most propagation delays have been neglected and only longer delays have been included in FIGS. 2 through 4.

A portion of controller 40 may be powered by standby power STBY also. This portion of the circuitry processes the low to high transition of signal SS and produces a low to high transition signal TOC. This signal is processed by turn-off protect circuit 35 to produce low to high signal transition OOC.

Signal OOC is delivered to power source 45 thereby commanding the power source to turn on. After a short time delay required to accomplish the actual power-up of the power source 45, signal PWR (which represents the power source output level) is turned on. This time is represented by T2. Also at time T2, power up reset circuit 60 delivers a power up reset pulse represented as a rectangular pulse PUR in the timing diagram. The power up reset is completed at time T3 and signal OC makes a low to high transition indicating that the power source 45 is now fully functional.

At time T4, the system clock which generates the CLK signal and is powered from signal PWR or STBY becomes fully functional and begins generating clock signals CLK. For proper timing for the present embodiment of the present invention, clock cycle TC may be approximately 600 ms in length but this is not to be limiting. On the first high to low transition of signal CLK, a high to low transition occurs at latch reset signal $\overline{LRST}$. This $\overline{LRST}$ signal functions to attempt to reset the switch status detector, but since switch signal SW is still at a low logic state, it is unable to do so.

At time T5, the switch 25 is deactuated by the user causing switch signal SW to make a low to high transition. At time T6, the next low to high transition of the clock occurs causing latch reset signal $\overline{LRST}$ to once again attempt to reset the switch status detector 30. This time, it is successfully able to do so since switch signal SW has made a low to high transition. Therefore, switch status signal SS makes a high to low transition at time T6.

It should be noted that a plurality of switches and switch detectors may be connected substantially in parallel so that any of the pager switches may be used to turn the pager on. Preferrably, only one switch is designated as off, therefore the controller should be able to determine which switch has been actuated during the off sequence for this alternate embodiment.

At time T7, the clock makes another low to high clock transition and controller 40 generates the turn-off protect circuit control signal $\overline{HPC}$ turning on the hardware turn-off protect circuit 35. Turn-off protect circuit status signal $\overline{HPS}$ then may verify to the controller 40 that turn-off protect circuit 35 has been successfully enabled. This optional step of verifying assures the proper operation of the turn-off protect circuit. The verifying step completes the turn-on sequence and normal pager or system operation proceeds.

Figure 3:
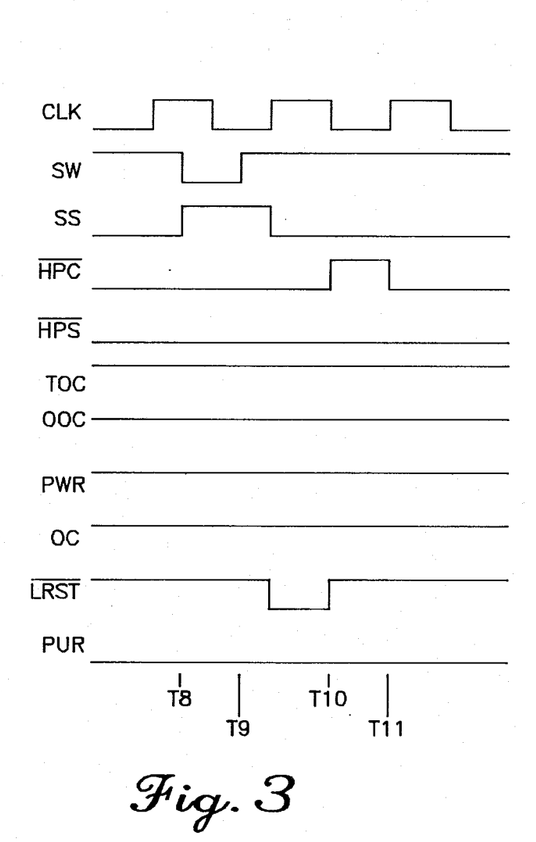
FIG. 3 shows a timing diagram for operation of switch 25 to control a system function other than on/off for the system of FIG. 1.

If switch 25 of system 20 is utilized to perform functions other than the on and off functions, the system operation as shown in FIG. 3 may be carried out. It will be evident to those skilled in the art that additional circuitry will be necessary to utillize switch 25 in another capacity since no provisions are being made herein in the preferred embodiment to accommodate such additional capacity. It will however, be readily apparent to those skilled in the art how to effect such additional capacity in switch 25.

Turning now to FIG. 3, a switch actuation occurs at time T8 causing a high to low logic transition of signal SW and the associated low to high transition of signal SS. At time T9, which is only a short time after the switch is actuated, the switch causing signal SW to make a low to high transition. At the next low to high clock transition signal, $\overline{LRST}$ attempts to reset the switch status detector and is successful, causing a high to low transition of signal SS.

At time T10 on the low going clock transition, signal $\overline{HPC}$ is generated by controller 40 in an attempt to defeat the turn-off protect circuit 35 since the switch status signal SS is now in a logic low state. This attempt to defeat turn-off protect circuit 35 is unsuccessful. At time T11, signal $\overline{HPC}$ returns to its high state. Thus, short duration switch closures do not turn off the system.

Figure 4:
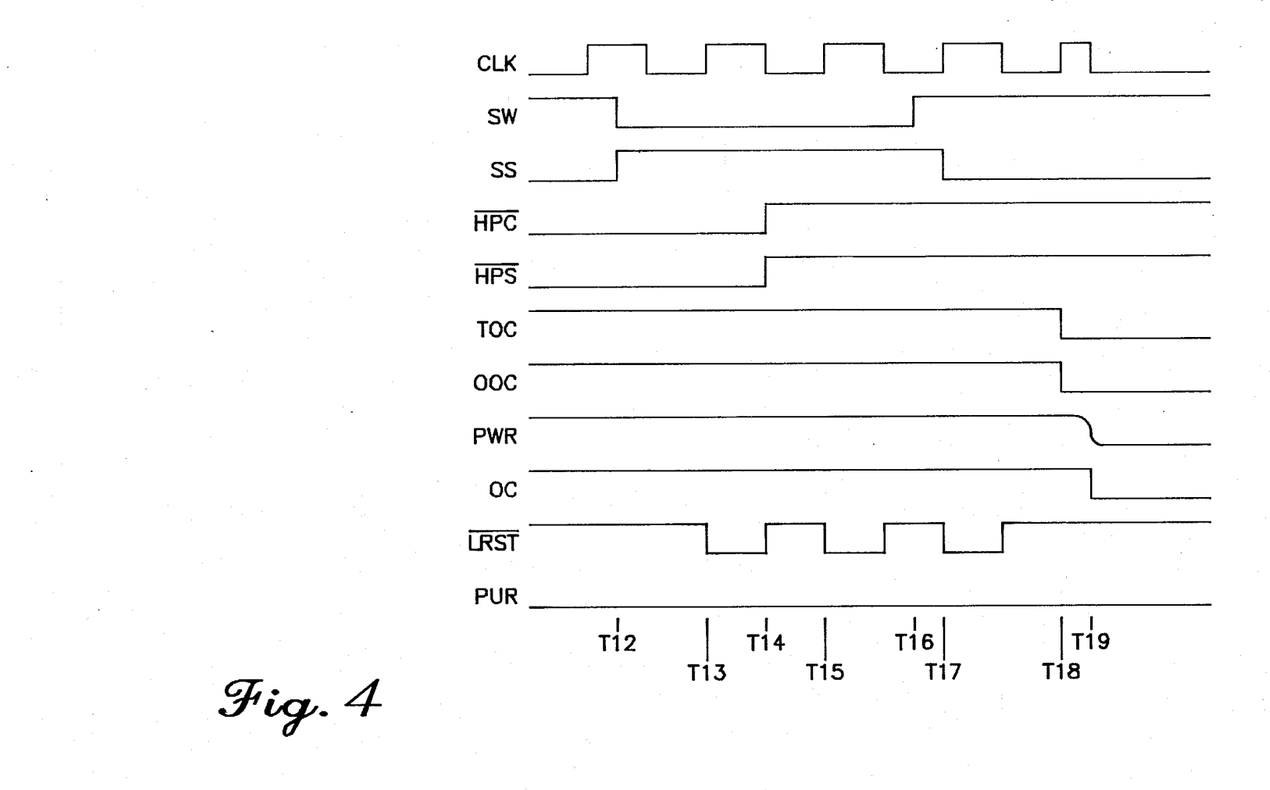
FIG. 4 shows a timing diagram for the turn-off cycle of a system of FIG. 1.

The powder-down sequence for system 20 is shown in FIG. 4. At time T12, the user actuates switch 25 to initiate the power down sequence causing signal SW to go from high to low and signal SS from low to high. On the next low to high transition of the clock signal CLK at time T13, signal LRST attempts to reset the switch status detector 30. Since the switch 25 is being held in actuation for an extended time (of perhaps one second) due to the user's desire to effect turn-off, signal SS remains high during this period and the switch status detector reset attempt is unsuccessful.

At time T14, a high to low clock transition occurs causing controller 40 to generate a low to high transition at signal $\overline{HPC}$ in an attempt to deactivate or disable turn-off protect circuit 35. Since signal SS is still high, this attempt is successful. The turn-off protect circuit verifies the success of this attempt by causing signal $\overline{HPS}$ to make a low to high transition in the preferred embodiment. One skilled in the art will recognize that the verifying step provides an additional degree of reliability by assuring the turn-off protect circuit 35 and switch status detector 30 are functioning correctly but may be viewed as optional if controller malfunction is the only concern.

Switch 25 may be deactuated at any time following T14 to cause system turn-off. At time T15, controller 40 once again unsuccessfully attempts to reset the switch status reset the switch status detector 30. This attempt is unsuccessful since switch 25 is still actuated. Therefore, system 20 remains on. At time T16, the user deactuates switch 25 to complete the manual portion of the turn-off sequence. At time T17, controller 40 once again attempts to reset switch status detector 30 this time successfully. This causes switch status signal SS to make a high to low transition.

Upon the next low to high clock transition occuring at time T18, controller 40 generates control signal TOC. Since turn-off protect circuit 35 is no longer enabled and therefore not inhibiting delivery of the turn-off signal to power source 45, signal OOC proceeds to power source 45 instructing the power source to turn off.

At time T19, which is a short time delay after time T18, the power output signal PWR goes low indicating that power has been removed from all full power circuits (but not STBY powered circuits). Power source 45 then sends signal OC to turn-off protect circuit 35 indicating that the power down sequence is complete.

This system provides improved protection against turn-off or other control signals occurring in the event that controller 40 loses program control or otherwise fails. In order for the present system 20 to fail, a switch actuation has to occur coincidentially with a $\overline{\text{HPC}}$ disable signal, the switch must be released after the first $\overline{\text{LRST}}$ pulse, the controller must inadvertently generate a TOC signal, and if the system has a deadman timer, such as the dual deadman timer disclosed in U.S. Pat. No. 4,414,623 to Davis et al., the contents of which is hereby incorporated by reference, all this must occur prior to the deadman timer time-out. By contrast, a system fully controlled by the controller can simply turn itself off upon loss of program control.

One skilled in the art will readily recognize that the probability of the above events occurring in the event of loss of program control is the product of each of the probabilities of each of the individual actions occurring inpendantly. Therefore, the probability of uncontrolled turn-off in the above system 20 is incredibly low.

Figures 5, 6:
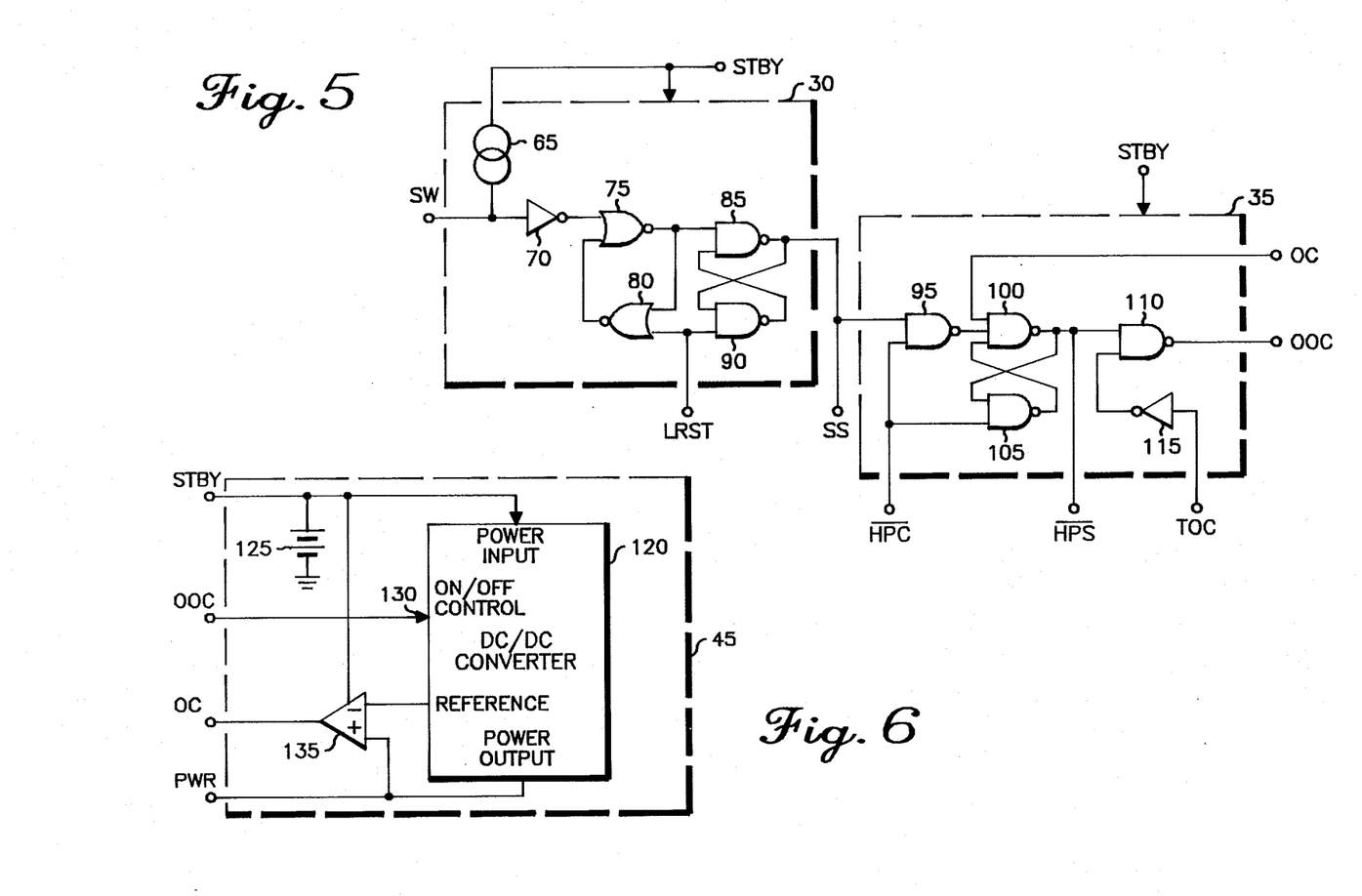
FIG. 5 shows the preferred embodiment of a switch status detector and a turn-off protection circuit for the present invention.
FIG. 6 shows one embodiment of the preferred power source utilizing a DC to DC converter in accordance with the present invention.

Turning now to FIG. 5, a preferred embodiment of switch status detector 30 and turn-off protect circuit 45 is shown. It will be readily understood by those skilled in the art that the specific embodiment shown in FIG. 5, although preferred, is only illustrative and many other functional embodiments are possible. Current source 65 is coupled to the SW input of switch status detector 30 to hold input SW at a logical high level except when switch 25 is actuated. The SW signal drives inverter 70 which inverts the logic level of signal SW. The output of inverter 70 drives one input of a NOR implementation of a set/reset (S/R) latch formed by NOR gates 75 and 80. The output of this S/R latch drives a NAND implemented set/reset type latch formed by NAND gate 85 and 90. The output of this NAND latch forms the SS signal delivered by switch status detector 30. The $\overline{\text{LRST}}$ signal is coupled to the second input of both of the switch status detector latch in order to provide a reset type signal to those latches.

The SS signal delivered by switch status detector 30 is coupled to one input and a NAND gate 95 of turn-off protect circuit 35. The output of NAND gate 95 is in turn coupled to a set/reset type latch structure formed by NAND gates 100 and 105. The $\overline{\text{HPC}}$ signal delivered by controller 40 is coupled to a second input of NAND gate 95 and NAND gate 105. The OC signal generated by power source 45 is coupled to a third input of NAND gate 100 providing a reset type signal to this latch. The turn-off protect circuit 35 operates upon standby power from the power source 45.

The output of this latch is taken at the output of NAND gate 100 and is coupled to an input of a NAND gate 110. The output of NAND gate 110 provides the OOC signal which controls the state of power source 45. The output of NAND 100 also forms the turn-off protect circuit status signal $\overline{\text{HPS}}$. The Turn-off control signal TOC is coupled to the input of an inverter 115 and the output of inverter 115 drives a second input to NAND gate 110.

Although the present invention may be utilized to provide hardware protection to any software generated control signal, in the preferred embodiment, this invention is utilized to control the state of a DC to DC converter in a miniature paging receiver. As such, the preferred implementation of power source 45 is shown in FIG. 6. A DC to DC converter such as the one disclosed in U.S. Pat. No. 4,355,277 to Davis, the contents of which is hereby incorporated by reference, may be readily adapted to serve as DC to DC converter 120 by one skilled in the art.

A DC to DC converter 120 is powered by a lower voltage battery 125 which is coupled to its power input. This battery 125 also preferrably serves to provide standby power STBY to any standby circuit which; must be operational at all times in the paging receiver. Preferrably an on/off control terminal 130 is provided on DC to DC converter 120. One skilled in the art will recognize that the dc to dc converter in the above-referenced patent may be adapted to function as converter 120 by providing an on/off switch to that converter circuit. This on/off control terminal is coupled to signal OOC in a manner that causes the DC to DC converter 120 to be operational and thus provide power output at its power output terminal (signal PWR) when a logical high signal is applied to terminal 130. When a logical low signal is applied to terminal 130, the DC to DC converter turns off and power output signal PWR drops to near zero.

A comparator 135 may be coupled to the power output signal PWR and to a reference voltage level which may be generated by the DC to DC converter. After turn-on by control signal OOC, the output power begins to rise to a voltage level which is usable by the full power circuits. When this power level reaches an acceptable level, comparator 135 trips and provides a change in signal OC at its output indicating that a sufficient output level at terminal PWR has been reached and all circuits should be operational.

In the preferred embodiment, controller 40 is preferrably a microcomputer based controller which is also utilized to control various other system functions. However, in an alternate equivalent embodiment, a hardware implemented state machine type controller having, for example, the architecture shown in FIG. 7 may be equally well utilized.

Figure 7:
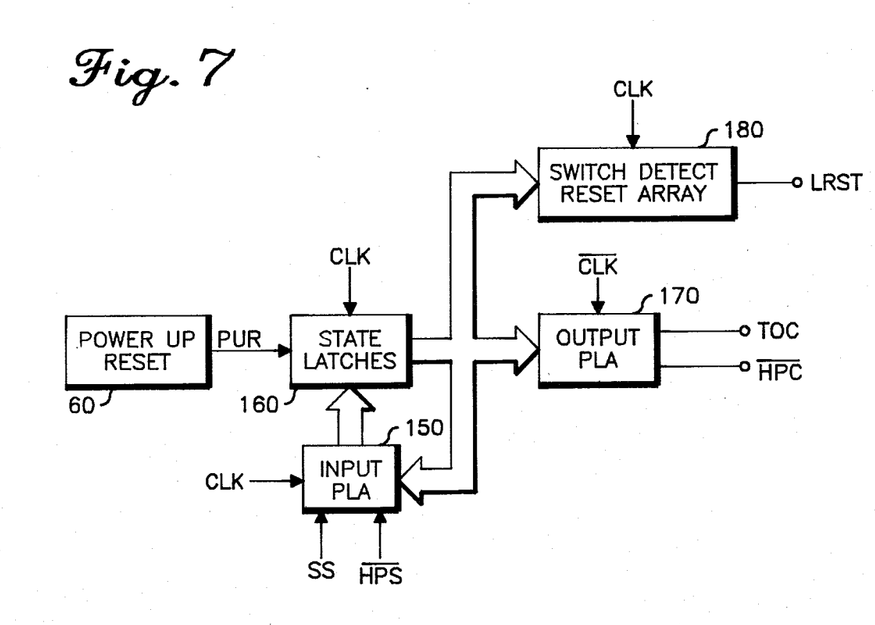
FIG. 7 shows a block diagram of a hardware implementation of the controller of the present invention.

An input programmed logic array (PLA) 150 accepts switch status signal SS and turn-off protect circuit status signal $\overline{\text{HPS}}$. A plurality of output connections couple the input PLA to a set of state latches 160. State latches 160 also receives clock signal CLK and power up reset signal PUR. The outputs of state latches 160 are directed to an output programmed logic array 170 which produces turn-off control signal TOC and turn-off protect control signal $\overline{HPC}$. In addition, the outputs of state latches 160 are reprocessed by the input PLA 150 and are directed to a switch detect reset array 180. Switch detect reset array 180 generates reset signal LRST. Signal CLK is also provided to input PLA 150 and switch detect reset array 180 while the inverse clock signal $\overline{CLK}$ is provided to output PLA 170.

Figure 8:
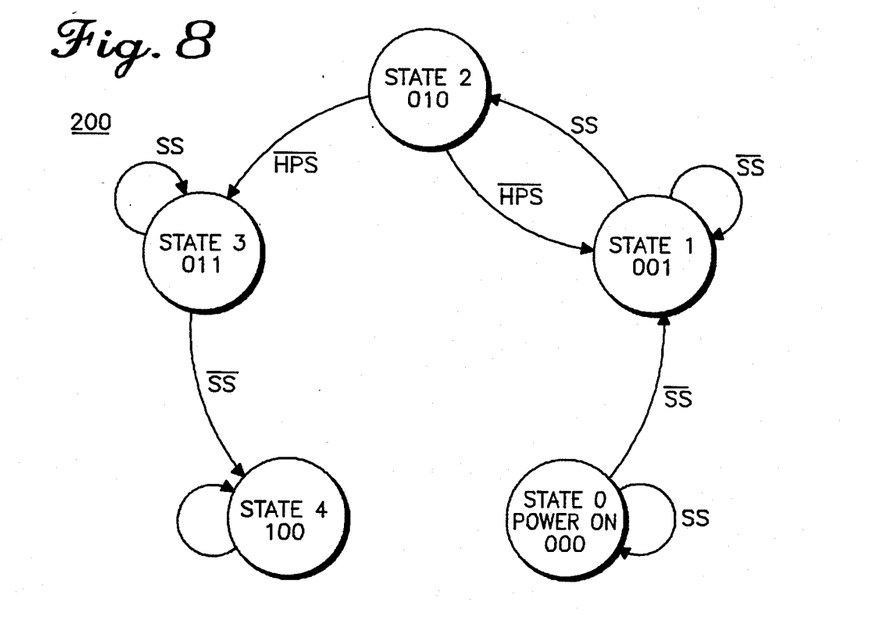
FIG. 8 shows a state flow diagram which may be used to understand further the hardware controller of the present invention.
Figure 9:
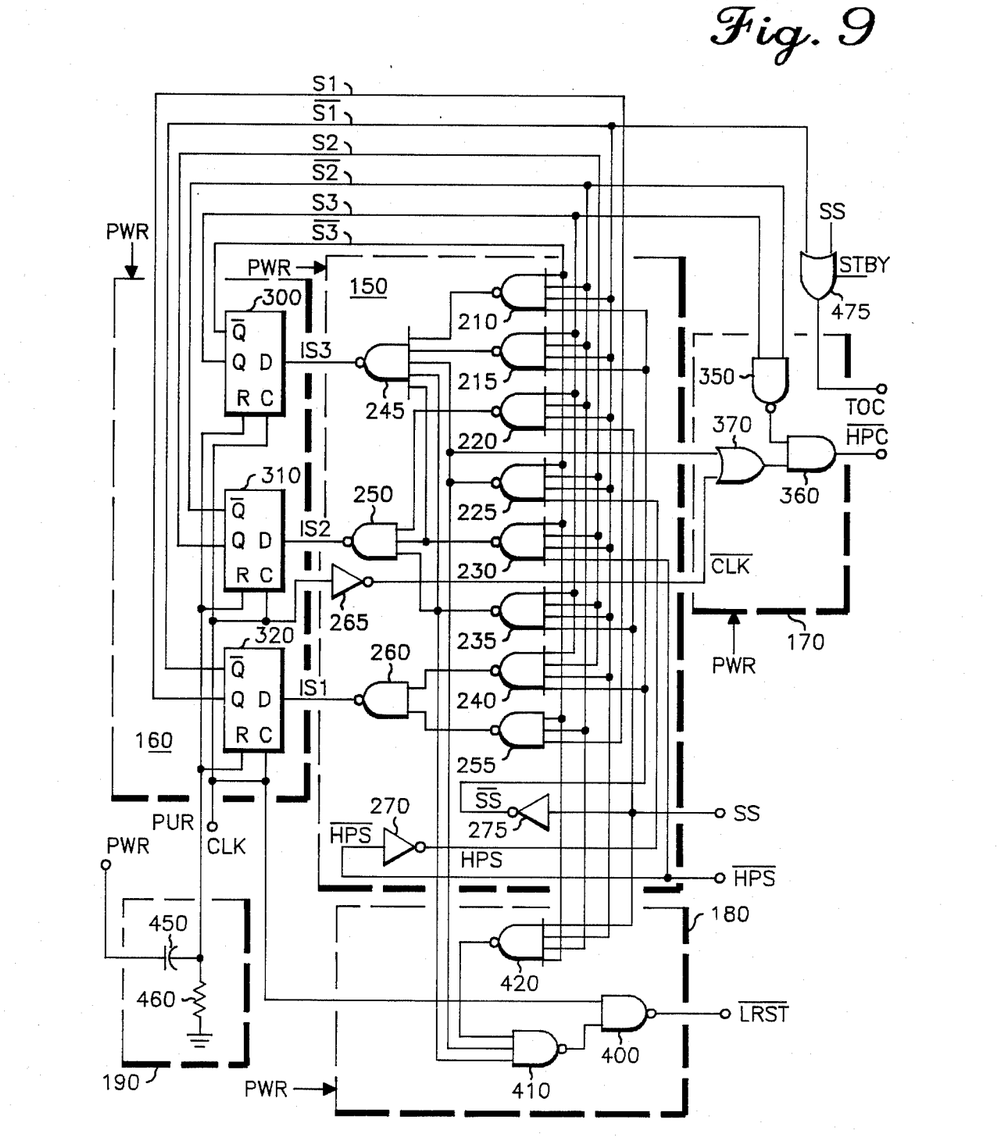
FIG. 9 is a logic circuit diagram for a controller according to the present invention which is designed in accordance with the block diagram of FIG. 7 and the state flow diagram of FIG. 8.

Utilizing this architecture in conjunction with Table 1 which shows the input and output states of all of the associated circuitry of FIG. 7, in conjunction with state flow diagram 200 as shown in FIG. 8 will result in an appropriate hardware realization of controller 40 as shown in FIG. 9. The X's of Table 1 represent inputs which are not being utilized by the controller at the particular state that the controller is in as determined by S1, S2, and S3.

TABLE 1

| INPUTS | | | | | OUTPUTS | | | | | |
|---|---|---|---|---|---|---|---|---|---|---|
| SS | $\overline{HPS}$ | S1 | S2 | S3 | IS1 | IS2 | IS3 | TOC | $\overline{HPC}$ | LRST |
| 1 | X | 0 | 0 | 0 | 0 | 0 | 0 | 1 | 1 | 0·CLK |
| 0 | X | 0 | 0 | 0 | 0 | 0 | 1 | 1 | 1 | 1 |
| 0 | X | 0 | 0 | 1 | 0 | 0 | 1 | 1 | 0 | 1 |
| 1 | X | 0 | 0 | 1 | 0 | 1 | 0 | 1 | 0 | 1 |
| X | 0 | 0 | 1 | 0 | 0 | 0 | 1 | 1 | 0·CLK | 0·CLK |
| X | 1 | 0 | 1 | 0 | 0 | 1 | 1 | 1 | 1 | 1 |
| 1 | X | 0 | 1 | 1 | 0 | 1 | 1 | 1 | 1 | 0·CLK |
| 0 | X | 0 | 1 | 1 | 1 | 0 | 0 | 1 | 1 | 1 |
| X | X | 1 | 0 | 0 | 1 | 0 | 0 | 0 | 1 | 1 |

Turning now to state flow diagram 200 as shown in FIG. 8, state 0 (S1, S2, S3=0, 0, 0) represents the condition of power on with the hardware turn-off protect circuit control signal $\overline{HPC}$ off and turn-off control signal TOC on. In this state, the system is awaiting a switch deactuation to create a high to low transition in signal SS.

State 1 (S1, S2, S3=0, 0, 1) is defined as the state wherein hardware protect control signal HPC is on and turn-off control signal TOC is on. In this state, the system is awaiting a high going transition of switch status signal SS. When that transition occurs, the state changes to state 2 (S1, S2, S3=0, 1, 0) wherein the turn-off portection is removed if possible and then the status of the turn-off protection circuit is interrogated. If signal $\overline{HPS}$ is low, system control returns to state 1 and if turn-off protect status signal $\overline{HPS}$ is high, control moves to state 3 (S1, S2, S3=0, 1, 1).

State 3 is characterized by signal $\overline{HPC}$ being high and signal TOC awaiting a high to low transition of switch status signal SS. Receipt of that signal transfers system control to state 4 (S1, S2, S3=1, 0, 0) which is characterized by signal $\overline{HPC}$ being high and signal TOC being low. In state 4, the system is turned off.

One skilled in the art may readily translate this system definition to a hardware state machine implementation of controller 40 which is equivalent to a preferred computer based controller. One such implementation utilizing primarily NAND-NAND implementation is shown in FIG. 9 wherein input PLA 150, state latches 160, output PLA 170, switch detect reset array 180, and power up reset circuit 190 are each respectively shown in broken lines.

In this preferred embodiment, input PLA 150 is powered by full power signal PWR and includes four input NAND gates 210, 215, 220, 225, 230, 235, and 240. It further includes five input NAND gate 245, three input NAND gates 250 and 255 and 2 input NAND gate 260.

Inverters 265, 270, and 275 also form a portion of the input program logic array 150.

State latches 160 are energized by full power signal PWR and include flip-flops 300, 310 and 320. Output PLA 170 includes two input NAND gate 350 AND gate 360 and OR gate 370. Output PLA 170 also receives energy from full power signal PWR.

Switch detect reset array 180 includes two input NAND gate 400, three input NAND gate 410 and four input NAND gate 420. Switch detect reset array 180 receives energy from full power signal PWR.

Power up reset circuit 60 includes a capacitor 450 and a resistor 460. A single OR gate 475 which is utilized to interface the state latches 160 to the output PLA 170 and to the switch status signal SS is supplied by standby power. This OR gate 47 may be considered a part of input PLA 150 since it helps process signal SS. The remainder of controller 40 is powered by full power signal PWR. Therefore, the standby current comsumption of controller 40 may be reduced to a negligibly small amount. Power up reset circuit 190 also receives energy from full power signal PWR.

The input and output signals of each of the functional blocks of hardware controller 40 are shown in Table 1 wherein signal S1 is the Q output of flip-flop 320, signal S2 is the Q output of flip-flop 310 and signal S3 is the Q output of flip-flop 300. Signals IS1, IS2, and IS3 are the outputs of NAND gates 260, 250 and 245 respectively.

The five inputs of NAND gate 245 come from the outputs of NAND gates 210, 215, 225, 235, and 230 respectively. The three inputs of NAND gate 250 are coupled to the outputs of NAND gates 220, 230 and 235 respectively. The two inputs of NAND gate 260 are coupled to the outputs of NAND gates 240 and 255 respectively.

The ouputs of NAND gate 245, 250 and 260 are coupled to the D inputs of flip-flops 300, 310 and 320, respectively. The C inputs of flip-flops 300, 310 and 320 are all coupled together and in turn coupled to clock signal CLK. The R inputs of flip-flops 300, 310 and 320 are also coupled together and form the power up reset input for state latches 160.

The $\overline{Q}$ output of flip-flop 300 is coupled to one input of each of NAND gates 210, 225, 230, 255 and 420. The Q output of flip-flop 300 is coupled to an input of each of NAND gates 215, 350, 220, 235, and 240.

The $\overline{Q}$ output of flip-flop 310 is coupled to an input of each of NAND gates 210, 215, 220, 255 420 and 350. The Q output of flip-flop 310 is coupled to an input of each of NAND gates 225, 230, 235 and 240.

THe $\overline{Q}$ output of flip-flop 320 is coupled to one input of OR gate 475 and to one input of each of NAND gates 210, 215, 220, 225, 230, 235, 240 and 420. The Q output of flip-flop 320 is coupled to the remaining input of NAND gate 255. The SS signal is coupled to the input of inverter 275 and to one input of each of NAND gates 420, 235, and 220. The output of inverter 275 is coupled to an input of each of NAND gates 240, 215 and 210. Turn-off protect circuit status signal $\overline{HPS}$ is coupled to the remaining input of NAND gates 230 in addition to the input of inverter 270. The output of inverter 270 is coupled to the remaining input of NAND gate 225. The three inputs of NAND gate 410 are coupled to the output of NAND gate 420, the output of NAND gate 225, and the output of NAND Gate 235. Clock signal CLK is also coupled to one input of NAND gate 400. The other input of NAND gate 400 is coupled to the output of NAND gate 410 and the output of NAND gate 400 forms latch reset signal $\overline{LRST}$.

The input of inverter 265 is coupled to clock signal CLK and the output of inverter 265 is coupled to one input of OR gate 370. The second input of OR gate 370 is coupled to the output of NAND gate 225. The two inputs of AND gate 360 are coupled to the output of NAND gate 350 and the output of OR gate 370 respectively. The ouput of AND gate 360 forms the source of signal $\overline{HPC}$ and the output of OR gate 475 forms the source of signal TOC. The SS input signal is coupled to the second input of OR gate 475. Power-up reset circuit 190 is formed by coupling one end of capacitor 450 to the PWR signal. The other end of capacitor 450 is coupled to one end of resistor 460 and the other end of resistor 460 is coupled to ground. The PUR signal is taken from the junction of capacitor 450 and resistor 460.

Figure 10:
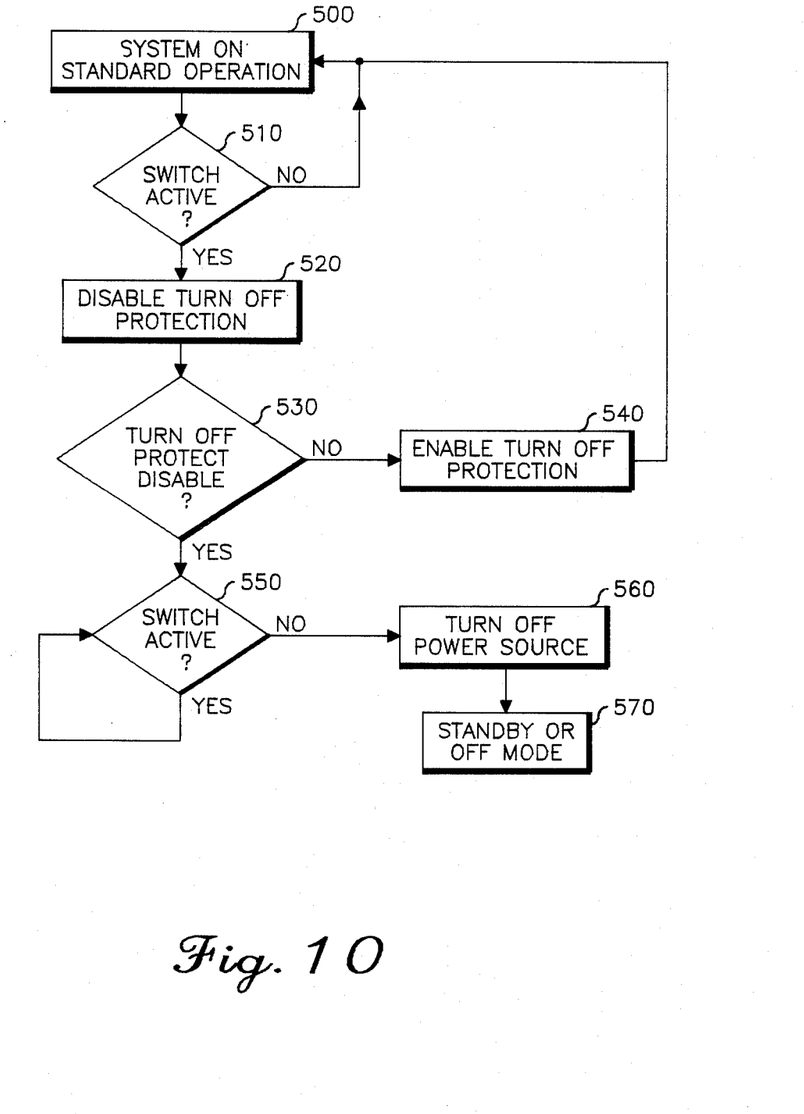
FIG. 10 is a flow chart describing the operation of the present invention.

In the preferred embodiment of the present invention, controller 40 is implemented using a low power mi- microcomputer such as the Motorola MC146805. A flow chart of the software utilized in this software based embodiment is shown in FIG. 10. At block 500 of FIG. 10, the system is on and operating in the standard mode of operation. The system periodically looks for a switch actuation at step 510. If no actuation has occurred, control goes back to step 500. If, on the other hand, the switch actuation has occurred, program control goes to step 520 wherein the controller attempts to disable the turn-off protection circuit.

At optional step 530, the controller inspects to see if it has successfully disabled the turn-off protection. If not, the turn-off protection is enabled at step 540 and program control returns to step 500. If the turn-off protect circuit has been disabled at step 530, program control proceeds to step 550 where the activity of the switch is once again monitored. If the switch is active at step 550, the program continues to monitor the switch's activity until the switch is deactuated. When the switch has been deactuated, program control goes to 560 where the power source is turned off. Step 570 represents the standby or off mode of the system.

Figure 11:
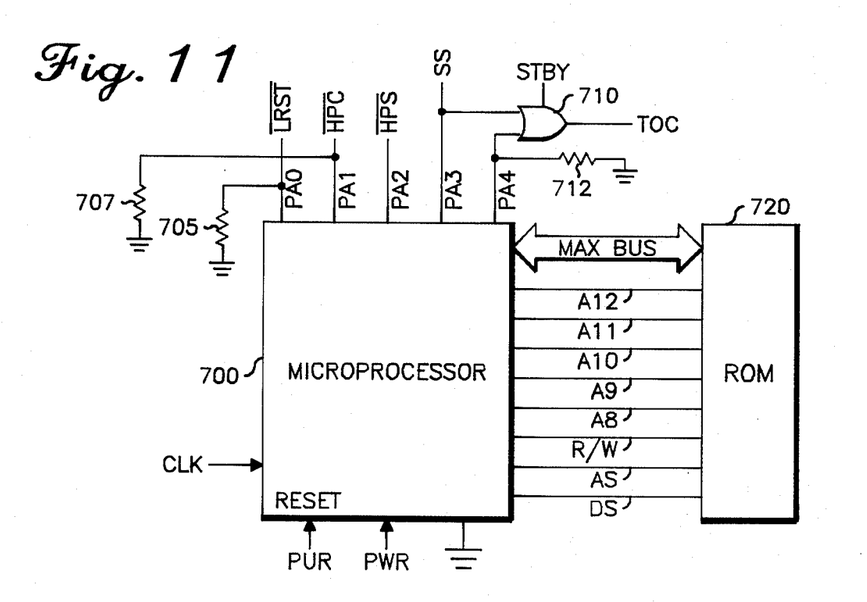
FIG. 11 shows a microprocessor based controller in accordance with the present invention.

One skilled in the art will readily recognize that the present invention is ideally suited to microprocessor or microcomputer based controllers, such as the controller shown in FIG. 11. A preferred controller such as the controller of FIG. 11 includes a microprocessor 700 such as a Motorola MC146805 family microprocessor. Details of the operation and programming of the MC146805 family are well known in the art. In this implementation, the clock signal is coupled to the clock input of the microprocessor. Signal PUR drives the reset input of the microprocessor and the microprocessor is powered by power signal PWR. The latch reset signal $\overline{LRST}$ is coupled to the PA0 line of microprocessor 700 and is pulled to a logic low by a resistor 705 when power to the controller is off. The $\overline{HPC}$ signal is derived from the PA1 line of microporcessor 700 which is also coupled to a pull-down resistor 707. The $\overline{HPS}$ signal enters the PA2 input of microprocessor 700. The SS signal enters the PA3 input of microprocessor 700. The PA4 output of microprocessor 700 is coupled to one input of an OR gate 710 and pulled down by a resistor 712 while the SS signal enters the second input of OR gate 710. The output of OR gate 710 provides the TOC signal. The OR gate is powered by Standby signal STBY.

A ROM 720 such as the Motorola MCM65516, in which the lower eight addressing bits are multiplexed address data lines, is appropriately coupled to microprocessor 700 so that the MUX bus, the DS line, AS line, read/write line and lines A8 through A12 are both microprocessor 700 and ROM 760 are all coupled together.

When ROM 720 is appropriately programmed with program code such as that appearing in Table 2, and a clock cycle of approximately 2.5 ms is provided to microprocessor 700, operation of the controller of FIG. 11 will be substantially the same as that of controller 40 as previously described. It is understood that the clock signal used in the software based implementation serves to clock the microcomputer rather than the controller logic. Timing is software controlled in the computer based controller thus resulting in a clock period substantially shorter than that of the hardware controller.

TABLE 2

| | | |
|---|---|---|
| 06 | 00 | FD |
| 11 | 00 | |
| 10 | 00 | |
| 12 | 00 | |
| 04 | 00 | 04 |
| 13 | 00 | |
| 20 | EF | |
| 11 | 00 | |
| 11 | 00 | |
| 06 | 00 | F9 |
| 19 | 00 | |
| 8E | | |

One skilled in the art will recognize that the embodiment described above required two sequential sets of two simultaneous occurrences to effect system turn-off. That is, signal $\overline{HPC}$ must be generated while signal SS is present and then, signal TOC must be generated while signal $\overline{HPS}$ is present in order for turn-off to occur. This combination provides virtually positive protection against uncontrolled self turn-off.

For systems requiring a somewhat reduced level of protection, a single set of simultaneous occurrences may be used. A system illustrating this alternate embodiment is shown as system 800 in FIG. 12. One skilled in the art will readily recognize that logic sense inversions may be necessary to implement the following alternate embodiment. Operation of this system and makeup of each of the system blocks may readily be derived from inspecting each system block with reference to those of system 20.

Figure 12:
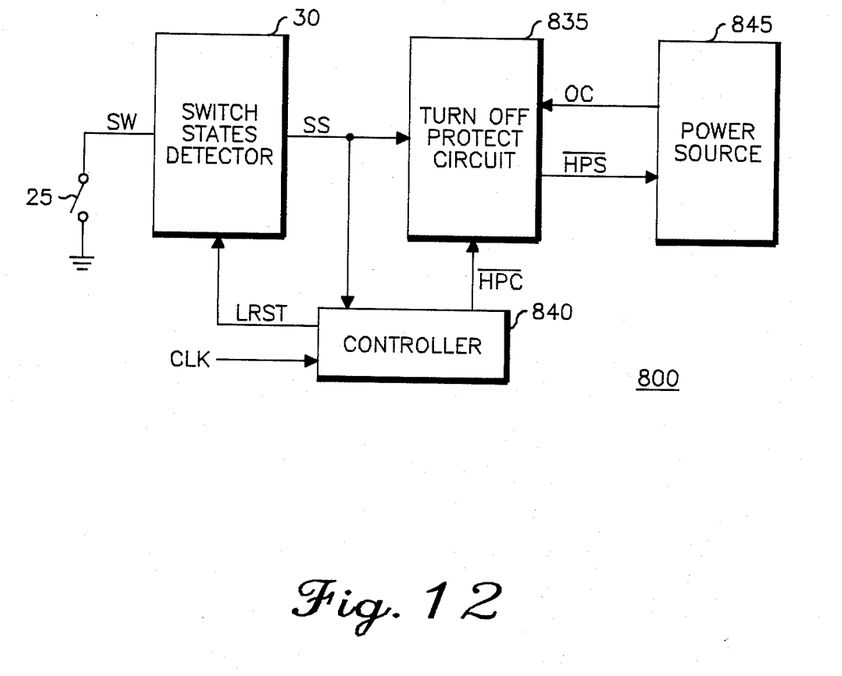
FIG. 12 shows an alternate embodiment of the present invention having a reduced level of turn-off protection.

A substantially modified turn-off protect circuit 835 is substituted for turn-off protect circuit 35 and a modified controller 840 is substituted for controller 40. For simplicity, the power interconnections have been omitted but are substantially the same as system 20.

In system 800, signal $\overline{HPS}$ is utilized to effect turn-off of a power source 845 rather than simply to deliver status information back to controller 840. Therefore, system operation up to the point of generation of $\overline{HPS}$ is similar to that of system 20. Controller 840 may be similar to controller 40 except for external interconnections or preferrably may delete circuitry for processing signals. $\overline{HPS}$ and TOC. Turn-off protect circuit 835 may be similar to circuit 35 or may preferrably delete gates 110 and 115. Power source 845 should be responsive to signal $\overline{HPS}$ appropriately to effect turn-off in response thereto.

Thus, it is apparent that in accordance with the present invention, a method and apparatus that fully satisfies

What is claimed is:

1. A method fo inhibiting a control signal generated by a controller system having a controller and at least one externally operated switch, said method comprising the steps of:
   (a) providing a protect circuit, the protect circuit responsive to the controller and the switch, the protect circuit being enabled for inhibiting the control signal from the controller;
   (b) sensing activation and deactivation of the switch for generating an authorization signal in response to the activation thereof, and terminating the authorization signal in response to the deactivation thereof;
   (c) generating a first control signal with the controller in response to the authorization signal;
   (d) monitoring the first control signal and the authorization signal with the protect circuit;
   (e) delaying a predetermined time period and disabling the protect circuit in response to the presence of the first control signal and the continued presence of the authorization signal to generate a second control signal; and
   (f) applying the second control signal to a device for controlling the device.

2. The method of claim 1, wherein step (f) of applying further includes applying the second control signal to a power source for powering the controller, wherein the second control signal ultimately removes power from said controller.

3. The method of claim 1 further including the step of generating a third control signal at the controller in response to the second control signal from the protect circuit and the termination of the authorization signal; and
   generating a fourth control signal with the protect circuit in response to the third control signal and the second signal, wherein the fourth control signal is applied to the device for controlling the device.

4. A method for confirming the activation of a control signal in a controller system having a switching means, the system including a protect circuit and a controller, the protect circuit being responsive to the controller and the switching means for generating the control signal, said method comprising the steps of:
   (a) activating the switching means to generate an authorization signal in response thereof;
   (b) detecting the aurthorization signal at the controller and generating a first confirmation signal in response thereof;
   (c) verifying the presence of the first confirmation signal and the authorization signal at the protect circuit and generating a first verification signal in response thereof; and
   (d) confirming the verification signal from the protect circuit and the authorization signal from the switching means at the controller and in response thereof generating a second confirmation signal, and furher wherein the protect circuit verifies the presence of the second confirmation signal from the controller to activate the control signal.

5. The method of claim 4 wherein step (c) of verifying includes confirming the deactivation of the switch before activating the control signal.

6. The method of claim 5 wherein step (d) of confirming includes waiting a predetermined period of time before confirming deactivation of the switch.

7. The method of claim 5 further including the step of applying the control signal to a power source for controlling the power source.

8. The method of claim 7 wherein the step of applying further includes turning off the power source.

9. The method of claim 7 wherein the step of applying further includes controlling a DC-to-DC converter.

10. The method of claim 4 wherein the step (d) of confirming further includes the step of
    verifying the presence of the second confirmation signal and first confirmation signal at the protect circuit to activate the control signal.

11. A device for protecting against unauthorized generation of control signals in a controller system, said device comprising:
    an external actuated switching means for detecting the activation of a switch and generating an authorization signal in response thereof;
    controller means responsive to the authorization signal for generating a first controller control signal in response thereof;
    protect means responsive to said authorization signal and responsive to said controller means, said protect means verifying the presence of the first controller control signal and generating a first protect circuit control signal in response to the presence of the authorization signal and the first controller control signal,
    wherein said controller means being responsive to said protect means confirms the first protect circuit control signal from the protect means and generates a second controller control signal such that the protect circuit verifies the presence of the second controller control signal to generate a second protect control signal, wherein the second protect control signal is applied to a device for controlling the device 12. The device of claim 11 wherein the controller means comprises:
    a timing clock for generating timing signals comprising a series of periodic timing pulses;
    a processing means responsive to the timing pulses wherein said first controller control signal is generated in coincidence with a timing pulse and said second controller control signal is generated at least one timing pulse after the first controller control signal, and further wherein the processing means, while operating in a predetermined mode, generates a series of reset signals having a predetermined maximum time period less than the time between the timing pulses; and
    a deadman timer means, responsive to the reset signals, for generating an interrupt signal whenever a reset signal is not generated within the predetermined maximum time period for the reset signal, the generation of the interrupt signal being indicative of the processing means operating in an undetermined mode, and wherein the processing means being responsive to the interrupt signal begins operating in a predetermined mode prior to generating the first and second controller control signal.

13. The device of claim 12 wherein the processing means comprises a microprocessor.

UNITED STATES PATENT AND TRADEMARK OFFICE
CERTIFICATE OF CORRECTION

PATENT NO. : 4,749,991
DATED : June 7, 1988
INVENTOR(S) : Walter L. Davis et al

It is certified that error appears in the above-identified patent and that said Letters Patent is hereby corrected as shown below:

Column 13, line 11, "fo" should read --of--.

Column 13, line 55, "aurthorization" should read --authorization--.

Column 13, line 66, "furher" should read --further--.

Signed and Sealed this

Sixth Day of December, 1988

*Attest:*

DONALD J. QUIGG

*Attesting Officer*   *Commissioner of Patents and Trademarks*